United States Patent Office 3,519,438
Patented July 7, 1970

3,519,438
PROCESS FOR PRODUCING A PACKAGED SMOKE-FLAVORED MEAT PRODUCT
Francis Glenn Connick, Downers Grove, Ill., assignor to Swift & Company, Chicago, Ill., a corporation of Delaware
No Drawing. Filed Feb. 13, 1967, Ser. No. 615,312
Int. Cl. A23b 1/10
U.S. Cl. 99—169                                8 Claims

ABSTRACT OF THE DISCLOSURE

Canned smoke-flavored meat products such as ham are prepared with liquid smoke, a distillate of wood smoke, by first spraying the liquid smoke onto the interior surfaces of a container and thereafter inserting the meat item into contact with the coated surfaces. Gelatin, which would otherwise react with the liquid smoke, is added in nonflowable form such as dry, flake or encapsulated, on top of the meat item; and the container is then closed and held briefly while the liquid smoke is absorbed on the meat from the container walls. Thereafter the item is heat processed with the result that the gelatin is solubilized in released juices, and redistributed about the meat items after the liquid smoke has been made unavailable for reaction.

---

This invention relates to the production of a smoke-flavored packaged meat item. More specifically, the invention relates to the production of a canned, smoke-flavored meat item such as ham.

Heretofore, smoked whole meat products such as ham, bacon, poultry, etc., have been produced by hanging the item for a number of hours in a smoke laden atmosphere. Most such items are thereafter sold for relatively immediate use by the consumer. However, some items are packaged for comparatively longer shelf-life and are usually heat processed to pasteurize and render the item substantially "shelf stable." In the processing of such packaged items, the smoking operation has, by far, involved the greatest amount of time, hand processing, and consequent expense. Furthermore, the whole items must be carefully selected for size compatible with the containers available for packaging. Otherwise the trimming of such whole items after smoking would result in the loss of smoked flavor and uniform appearance.

Recently, the application of a smoked flavor to meat products has been facilitated by the introduction and approval of so-called liquid smoke compounds. While such materials resist precise definition, they may be generally identified as those products recovered from and/or condensation products resulting from, the burning of woods (both soft and hard) collected in solvents or aqueous media; and recognized as having a standard of identity accepted by the United States Department of Agriculture and the Food and Drug Administration of liquid smoke and liquid smoke flavoring. The materials may also be partially defined by chemical analysis (1) for total acidity as acetic acid with a range of 5.8%–6.7% weight per volume, (2) phenol concentration expressed as 2,6-dimethoxythenol using the modified Gibbs method with a concentration range 5.5–8.7 mg./ml., and (3) carbonyl concentration based on the modified Lappan-Clark method, 6%–12% weight/volume. Hereinafter, such materials will regularly be referred to as liquid smoke. An example of such material, in aqueous form, is "Charsol C–6 Hickory" manufactured by the Red Arrow Products Corp. of Manitowoc, Wis. The latter material was used consistently in the work reported hereinafter. While other materials may vary in strength or dilution it is believed that they may be utilized to the same advantage when in equivalent amounts. Accordingly the precise limitations disclosed and claimed hereinafter should be construed so as to include larger or smaller limits of other liquid smoke materials that produce equivalent results.

While liquid smoke has now been accepted in the industry, it is used mainly in processed meat products such as bolognas and sliced bacon. When used to flavor whole items such as hams, and the like, it is applied directly to the ham as a separate step substituted for previous smoking by hanging in a smoke-laden atmosphere.

Obviously, it would be of advantage if the application of smoke flavoring to whole meat items could be incorporated in packaging procedures. However, it is also desired that a quantity of gelatin be included in the package about the meat item. Gelatin is desired as it is a convenient carrier for spices and delicate flavorings, and also because it improves the appearance of the item by filling voids, combining with cooked-out meat juices, and glazing the meat surfaces. Unfortunately, gelatin will react with liquid smoke materials and become polymerized to an inedible or unpalatable rubbery form. Accordingly, it has heretofore been thought impossible to incorporate liquid smoke and gelatin directly in the packaging procedures because of the consequent reaction and loss of availability of the smoke flavoring to the meat.

Accordingly, it is a principal advantage of the present invention to provide an improved process and product wherein both liquid smoke and gelatin may be combined with a meat product in a packaging operation.

Generally, the present invention is accomplished by applying a coating of liquid smoke materials to the interior surfaces of a package enclosure and then inserting the body of meat therein and into contact with the coated surfaces whereby the liquid smoke may be transferred to, and absorbed by, the meat surfaces. Before closing the package enclosure, a quantity of gelatin in nonflowable form is added and the package then closed. Thereafter, it is preferable to maintain the closed package at about the filling conditions for a few minutes to allow substantially complete absorption of the liquid smoke on the meat surfaces. Thereafter, the item is given the usual heat processing for pasteurization or shelf stability which will result in solubilizing the gelatin by heat and release meat juices whereby the gelatin will become redistributed about the meat surface.

In a preferred process, a liquid smoke composition is applied to can interiors by spraying. For this purpose, it is often desirable to adjust the viscosity of the liquid smoke solution to a level compatible with the type of spray equipment used. Usually, a viscosity between 2500 and 1800 centipoise, as meaursed with a Brookfield viscosimeter Model LVF, is suitable. However, it must be understood that other means of application such as dipping, pouring, wiping and brushing may also be employed.

Where necessary to thicken the aqueous liquid smoke solution, such as the aforementioned "Charsol" product, most of the food grade thickeners may be employed. Gum guar is a preferred thickener. Other vegetable gums such as locust bean gum, gum tragacanth, and gum arabic are suitable. Also seaweed products such as carrageenan and alginates are satisfactory. Starch thickeners and cellulose gums such as carboxymethyl cellulose, methyl cellulose, and avicel may also be used. When solvent collected and fat soluble smoke flavors, such as "Firmenich Smoke Flavoring 51.676/TR" manufactured by Firmenich, Inc., Geneva, Switzerland, are used it is advisable to employ edible oils with a viscosity range of 100 cp.–2000 cp. at 25° C. as thickeners. This level can vary according to the applicator equipment to be utilized.

The amounts of such thickeners will vary according to the characteristics of the initial liquid smoke solution and the type of applicator equipment to be used. Where spraying liquid smoke, gum guar may be added in amounts between ½% and 2% by weight with the larger amounts being associated with relatively higher temperature and higher pressure applications. For instance, 1.2% gum guar at room temperature and 40-pound spray pressure is usually satisfactory.

The amount of liquid smoke to be utilized may be best related to the surface area of the package enclosure, assuming that it will closely conform to the surfaces of the meat item filled therein. The exact amount of liquid smoke may vary widely and is dictated principally by taste requirements. Usually, this will range between .001 and .002 ounce per square inch of enclosure surface. Amounts lower than this will not usually introduce a perceptible taste in the product. Amounts exceeding this range may cause a bitter taste, but are most objectionable in that some material will not be absorbed by the meat surface and will thus be available to react with gelatin. It is also preferred that the uppermost portion of the enclosure, such as a can lid or top where a rigid can is utilized, not be coated with the liquid smoke material as the latter will not come into direct contact with the meat surface but will confront the added gelatin.

The amount of liquid smoke to be utilized may also be less precisely prescribed in accordance with the weight and type of meat product being processed and the type of liquid smoke being utilized. For example, cured hams, when processed according to the disclosed method, will accept between .075% and .75% liquid smoke, by weight, and result in a perceptibly and satisfactory smoked flavored product.

Following coating of the interior package surfaces, the meat item is inserted in the usual fashion. The time interval alone at which this is done is not critical. However, care should be taken that the liquid smoke material does not flow to the bottom of the can. Viscosity and temperature adjustments will aid in controlling this factor. Also, the filling of coated cans should not be excessively delayed to the point that the more volatile flavor ingredients are lost to the atmosphere. Similarly, filling temperatures are not critical, and a rather broad temperature range is permissible.

Immediately following the insertion of the meat item into the coated container or enclosure, gelatin is added to the upper surface of the meat. It is important that the gelatin be added in a nonflowable form. Preferably, the gelatin is non-hydrated and is a dry powder or flake. However, encapsulated hydrated gelatin may be utilized where the encapsulating material will melt within the range of 100°–140° F. Suitable encapsulating materials are hydrogenated or hardened vegetable oils, and sugar base compositions that can be formed on gelatin capsule manufacturing equipment. The dry powdered or flaked gelatins are preferred due to their availabilty and ease of handling. They are also readily adaptable to dispensing by available mechanical apparatus. The total amount of gelatin to be added to a given item is not critical but depends greatly upon the nature of the product, the size and type of package enclosure, customary and previous levels of usage in similar products, and governmental regulations covering food additives. The dry form of gelatin should be regarded as equivalent to approximately 300%, by weight, of a hydrated material.

The added gelatin material may also include small amounts of salt and spices.

Following the addition of gelatin, the package is closed in the usual manner. Where the package enclosure is a can, a lid is applied by a suitable closing machine. Preferably the top closure is not treated with liquid smoke. Since the top surface of the meat item is now covered or partially covered by gelatin, any liquid smoke on the top closure would not reach the meat surface but would be available to react with the gelatin upon solubilization of the latter.

Preferably the closed package is retained at about the filling conditions for a brief period of from about 5–15 minutes to facilitate the absorption of the liquid smoke onto the meat surface. Again this time period is not critical and will vary greatly with the type of product, viscosity and amount of liquid smoke, and ambient temperature. Thereafter, the packaged items are subjected to heat processing of the type usual for similar products. Such processing is usually aimed at lengthening refrigerated shelf life by pasteurization or destruction of pathogenic organisms, and is a combination of time and temperature criteria governed by standard tables available from the National Canners Association, Washington, D.C. Generally, the processing involves raising the temperature of the centermost portion of the product to about 150°–170° F. Similarly, if a non-refrigerated shelf-stable product is desired, the heat treatment is more severe, with the product being heated to about 225° F. In the course of this treatment, juices will be released from the meat and will result in solubilizing the dry-form gelatin. If encapsulated hydrated gelatin is utilized, the temperature increase to above the melting range of 100°–140° F. will release the hydrated material to mix with the released juice. Consequently, the gelatin becomes liquid and redistributes itself about the meat within the container. However, by this time virtually all of the liquid smoke material will have been absorbed into the meat and will no longer be available for reaction with any of the gelatin.

Subsequently, following termination of the heat treatment, the meat item is cooled and usually refrigerated. Thereupon the gelatin will gel on the surfaces of the meat product.

EXAMPLE I

Hams of various sizes were prepared and filled into appropriately sized pear-shaped cans previously coated by spraying a "Charsol" liquid smoke solution thickened with about 1% gum guar. Total amounts of liquid smoke applied are shown in the following table. Dry gelatin in flake form was added atop the ham in each unclosed container in amounts according to the following table. Thereafter, the cans were closed and heat processed to an internal meat temperature, calculated basis, of 150° F. Heating was accomplished in a retort, or other suitable cooking vessel, at 170° F. for periods ranging from 2 hours, for 3-pound pear-shaped hams, to a maximum of 5 hours for 10-pound pear-shaped hams. All products were subsequently opened and displayed an attractive, uniform appearance with good distribution of gelatin, and were found to have a satisfactory smoked flavor comparable to similar product processed through smoking chambers.

| Ham size (pear shape) | Dry gelatin (oz.) | Liquid smoke (oz.) |
|---|---|---|
| 3-pound | ¼ | 0.12–0.13 |
| 5-pound | ⅓ | 0.15–0.16 |
| 6-pound | ½ | 0.16–0.17 |
| 6¾-pound | ½ | 0.18–0.20 |
| 8-pound | ¾ | 0.20–0.21 |
| 10-pound | 1 | 0.21–0.22 |

EXAMPLE II

Beef insides (beef hind quarter cushion muscles) were cut in exact weights to fit various size pear-shaped and Pullman-shaped (rectangular tube) cans. Liquid smoke was sprayed on the inside surface of the containers and meat items then inserted. A combination spice and gelatin was added to the top of the meat in each can, the mixture containing gelatin, salt, garlic powder and essence of celery. The cans were then closed, held for a few minutes and then cooked to an internal temperature of approximately 160° F. in accordance with standard procedures for shelf stability and storage as a perishable product. Each item acquired a pleasant smoke flavor.

| Can size | Gelatin | Liquid smoke (oz.) |
|---|---|---|
| 3-pound pear | 1-oz. dry powder | 0.12–0.13 |
| 8-pound pear | 2-oz. dry powder | 0.20–0.21 |
| 3-pound Pullman | 1 oz. dry powder | 0.14–0.15 |
| 8-pound Pullman | 2 oz. dry powder | 0.21–0.22 |

EXAMPLE III

Beef insides were cut to measured excess weights and then dry-roasted on the surfaces to a 15% shrink. The dry roasting was intended to secure a flavor development. The items were then handled according to the same procedure as Example II and a satisfactory smoke-flavored product resulted.

| Can size | Gelatin | Liquid smoke (oz.) |
|---|---|---|
| 3-pound pear | 1 oz. dry powder | 0.12–0.13 |
| 8-pound pear | 2 oz. dry powder | 0.20–0.21 |
| 3-pound Pullman | 1 oz. dry powder | 0.14–0.15 |
| 8-pound Pullman | 2 oz. dry powder | 0.21–0.22 |

EXAMPLE IV

Boneless turkey breasts were placed in pear and Pullman-shaped cans wherein the inner surfaces had been sprayed with liquid smoke. Thereafter, a spice mixture containing gelatin, maple sugar, salt and protein hydrolisates was added on top of the meat. The cans were then closed and the product cooked to an internal temperature of 170° F. In each instance, the product acquired a smoked flavor.

| Can size | Gelatin | Liquid smoke (oz.) |
|---|---|---|
| 3-pound Pullman | 1 oz. dry powder | 0.14–0.15 |
| 6-pound Pullman | 2 oz. dry powder | 0.20–0.21 |

EXAMPLE V

Boneless pork loins were defatted and otherwise prepared with barbecue sauce being added in addition to the gelatin and spice mixture. Sampling of this product demonstrated a savory meat product with a perceptible smoke flavor.

Obviously many modifications and variations of the invention as hereinbefore set forth may be made without departing from the spirit and scope thereof, and, therefore, only such limitations should be imposed as are indicated in the appended claims.

I claim:
1. An improved method for producing a packaged and smoke-flavored meat product comprising: applying a coating of liquid smoke to the bottom and side-wall interior surfaces of a package enclosure; inserting a body of meat into said enclosure and in contact with the coated interior walls thereof; adding a quantity of nonflowable gelatin to an exposed upper surface of said meat, said gelatin not contacting said enclosure surfaces; closing said package enclosure completely about said meat and gelatin; and holding said meat in contact with said enclosure walls without substantial change in temperature for a period of time to absorb the liquid smoke from the enclosure walls onto the meat surfaces.

2. The method of claim 1 wherein the liquid smoke is applied to said enclosure walls in an amount of about .001 ounce to .002 ounce per square inch of coated surface.

3. The method of claim 1 wherein the gelatin is added in a dry form and the enclosure surface that will cover said exposed upper surface of said meat is uncoated by said liquid smoke.

4. The method of claim 1 wherein the package is held after closing for a period of 5–15 minutes to promote absorption of said liquid smoke onto the meat surfaces, and then heat processing the package to an internal meat temperature of at least about 150° F., whereupon said gelatin is solubilized by released meat juices and redistributed thereby about said meat.

5. An improved method for producing a canned and smoke-flavored meat product, said method comprising: coating the interior surfaces of an open top can with a liquid smoke solution; filling a body of meat into said can and into contact with the coated surfaces thereof; depositing a quantity of nonflowable gelatin on the top surface of said meat in said can, said gelatin not contacting said interior surfaces; closing the can with a lid uncoated by said liquid smoke; holding the closed can for a few minutes at about the filling conditions while said coating of liquid smoke is absorbed by said meat; and thereafter heat treating the canned meat to an internal temperature of at least about 150° F., whereby said gelatin will be solubilized and redistributed by released meat juices.

6. The method of claim 5 wherein said liquid smoke is applied to can walls in an amout of about .001 ounce to about .002 ounce per square inch of coated surface.

7. The method of claim 5 wherein ham is filled in a can coated with liquid smoke and dry gelatin added thereto in an amount of about .1 ounce dry weight per pound of meat.

8. The method of claim 5 wherein ham is filled in a can coated with liquid smoke in a total amount of about .075% to .75% of the weight of said meat.

References Cited

UNITED STATES PATENTS

| 1,883,657 | 10/1932 | Ettinger | 99—176 |
| 2,733,152 | 1/1956 | Edgar | 99—187 X |
| 3,067,041 | 12/1962 | Monteleone | 99—187 |
| 3,071,477 | 1/1963 | Kleveus | 99—166 X |
| 3,073,702 | 1/1963 | Keil et al. | 99—169 |
| 3,255,689 | 6/1966 | Kielsmeier et al. | 99—229 |
| 3,330,669 | 7/1967 | Hollenbeck | 99—166 |

NORMAN YUDKOFF, Primary Examiner

F. E. DRUMMOND, Assistant Examiner

U.S. Cl. X.R.
99—107, 174, 187, 229